United States Patent [19]

King et al.

[11] Patent Number: 4,621,525

[45] Date of Patent: Nov. 11, 1986

[54] ACCELERATOR PEDAL ACTUATOR SYSTEM FOR AUTOMATIC DRIVING SYSTEM

[75] Inventors: Francis G. King, Bloomfield Hills; Stewart V. Gable, Ypsilanti, both of Mich.

[73] Assignee: Ford Motor Company, Dearborn, Mich.

[21] Appl. No.: 800,098

[22] Filed: Nov. 20, 1985

Related U.S. Application Data

[63] Continuation-in-part of Ser. No. 682,454, Dec. 17, 1984, abandoned.

[51] Int. Cl.[4] ............................................ G01M 15/00
[52] U.S. Cl. ..................................................... 73/117
[58] Field of Search ................ 73/116, 117, 117.1, 73/117.2, 117.3, 118

[56] References Cited

U.S. PATENT DOCUMENTS

| | | | |
|---|---|---|---|
| 2,281,159 | 4/1942 | Kliesrath et al. | 74/856 |
| 3,465,577 | 9/1969 | Donovan | 73/116 |
| 3,662,593 | 5/1972 | Pirrello et al. | 73/116 |
| 3,712,126 | 1/1973 | Campbell | 73/117 |
| 3,713,332 | 1/1973 | Herrbrich | 73/117 |
| 3,877,299 | 4/1975 | Clayton, Sr. et al. | 73/117 |
| 4,393,695 | 7/1983 | Marshall et al. | 73/117.3 |
| 4,466,279 | 8/1984 | Gable et al. | 73/117 |
| 4,554,824 | 11/1985 | King et al. | 73/117 |

FOREIGN PATENT DOCUMENTS 0071929  5/1980  Japan ................................. 73/117

Primary Examiner—Stewart J. Levy
Assistant Examiner—Robert R. Raevis
Attorney, Agent, or Firm—Peter Abolins; Robert D. Sanborn

[57] ABSTRACT

An automatic driver system includes an accelerator pedal actuator system with a contact sensor for sensing contact between the actuator system and the accelerator pedal. A mechanical actuation system is mounted in the vehicle to contact and move the accelerator pedal. An electronic actuator is mounted outside the vehicle for causing movement of the accelerator pedal and includes a motor coupled to a tachometer for measuring rotational speed, a lead screw assembly for transforming rotational movement to linear movement and a linear displacement transducer for measuring linear position of the lead screw assembly. The system permits a new reference point to be established each time the accelerator pedal actuator system is installed in a vehicle.

7 Claims, 5 Drawing Figures

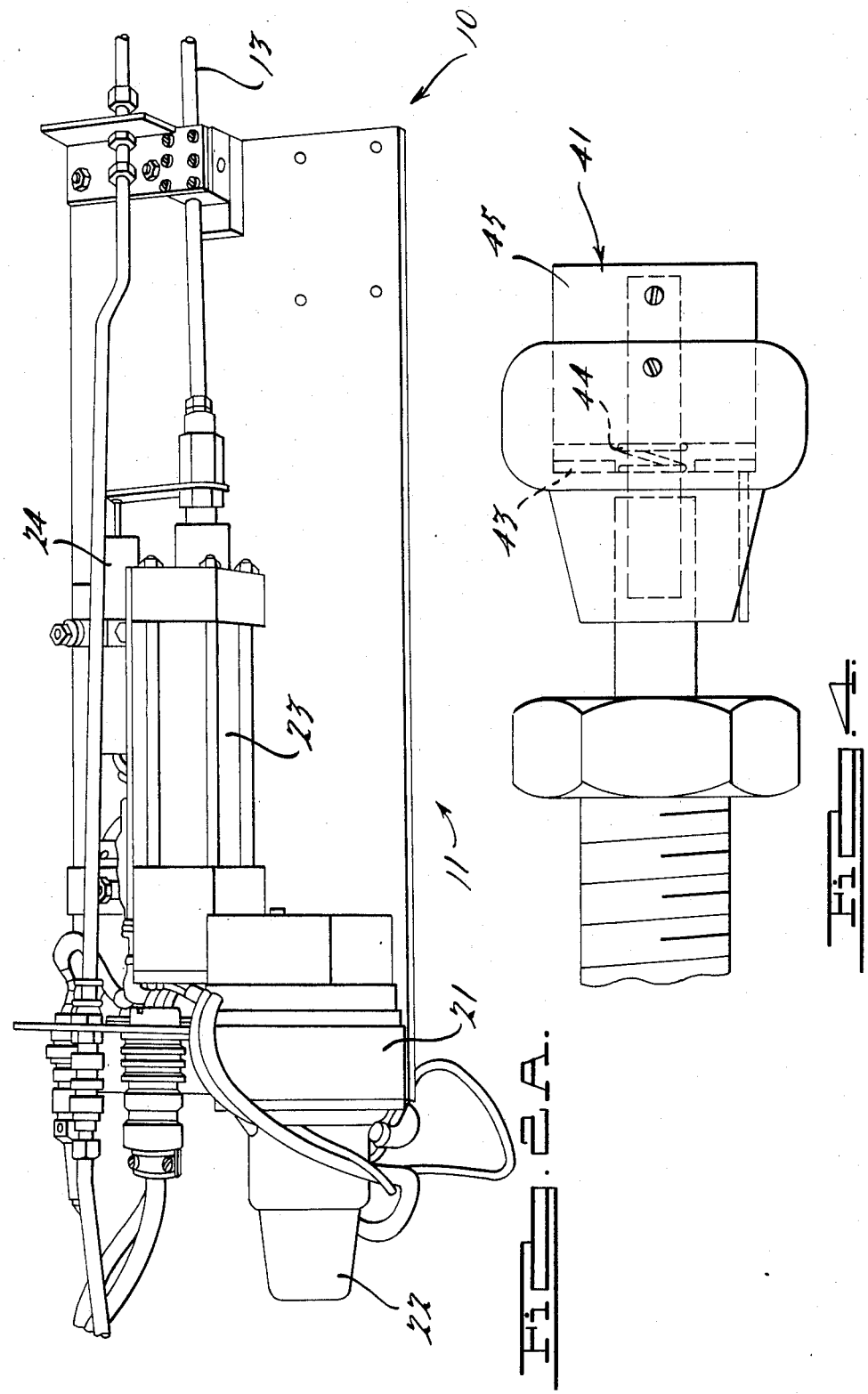

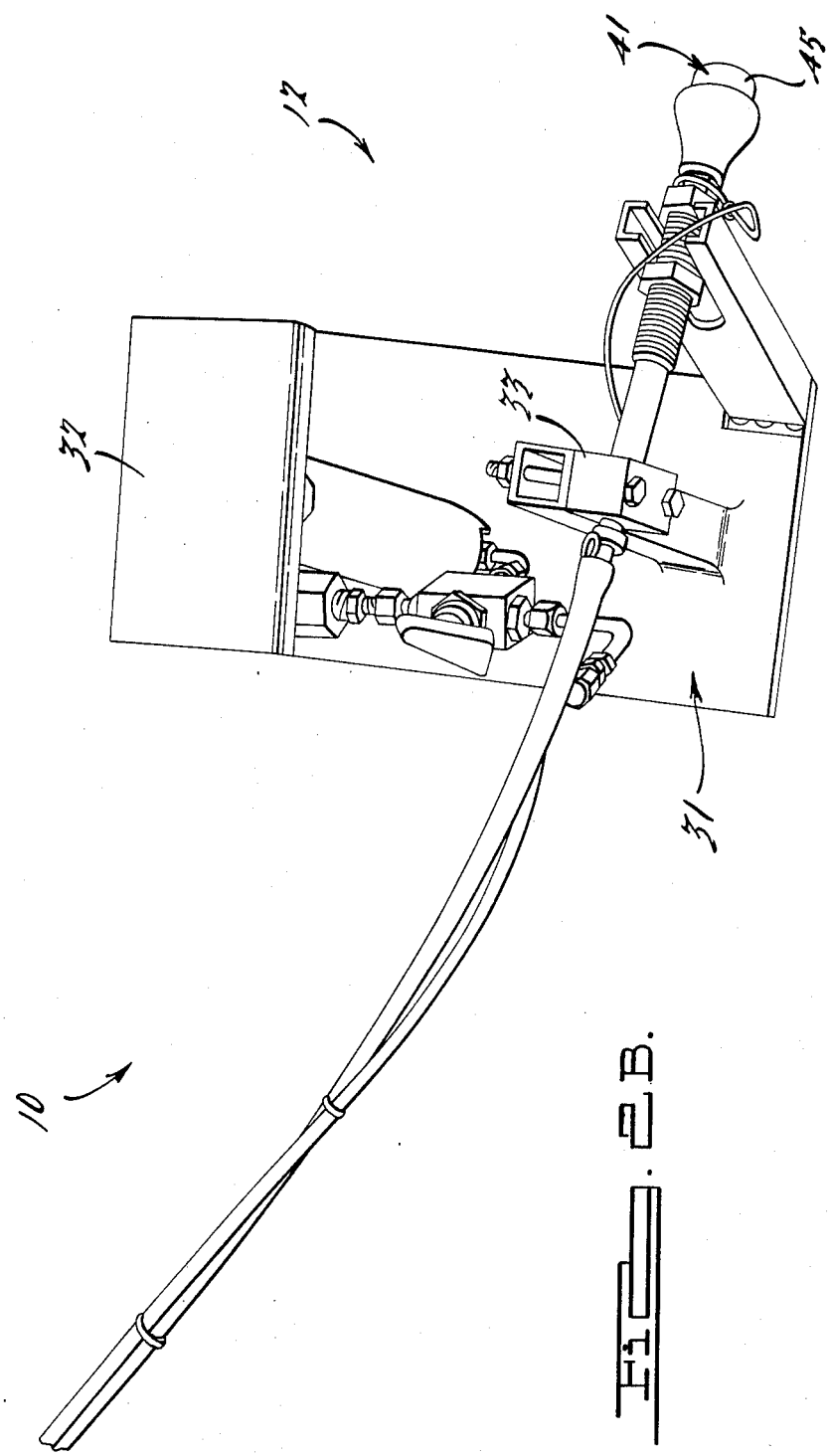

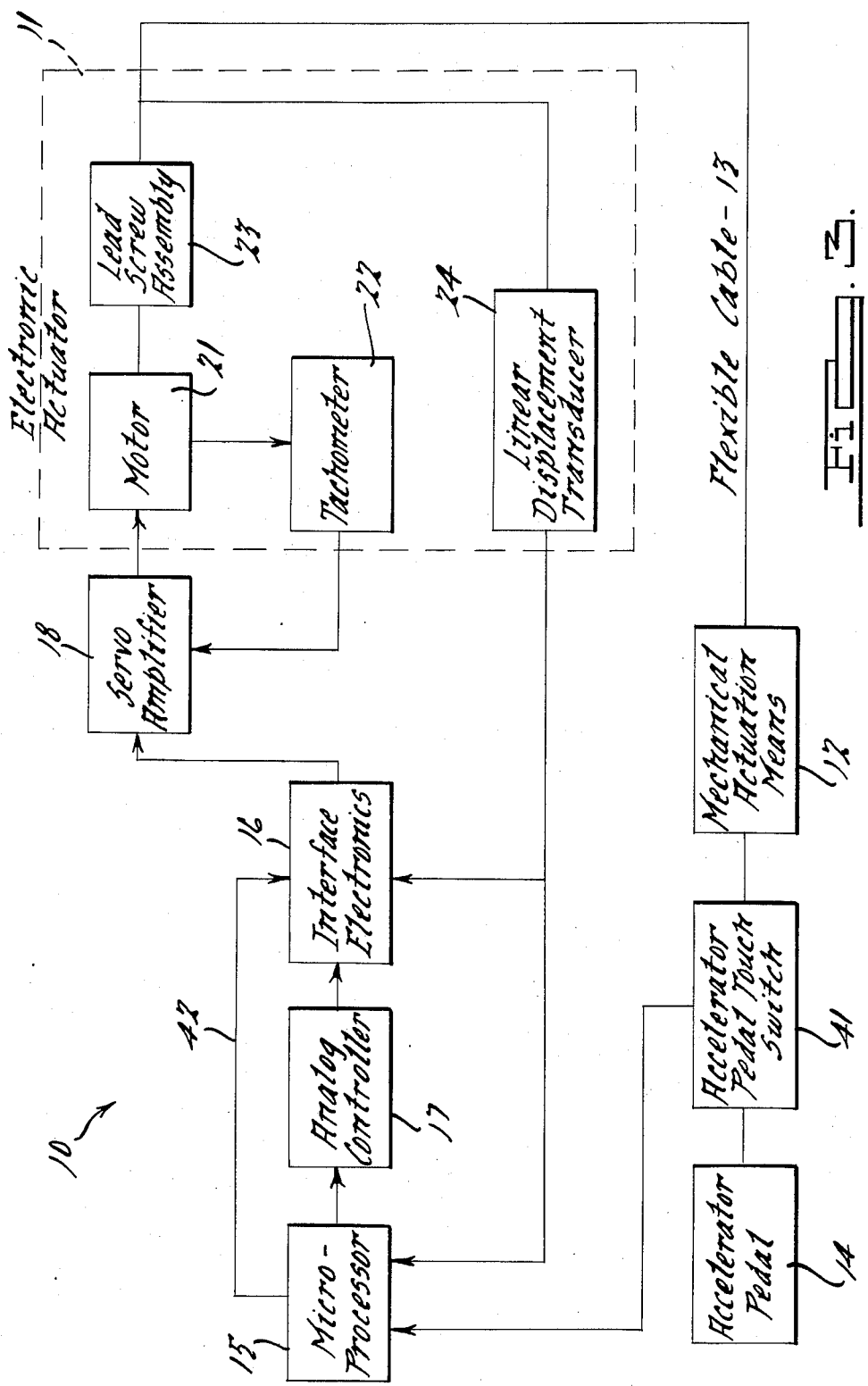

ACCELERATOR PEDAL ACTUATOR SYSTEM
FOR AUTOMATIC DRIVING SYSTEM

BACKGROUND OF THE INVENTION

This is a continuation-in-part application of Ser. No. 682,454 filed on Dec. 17, 1984 and now abandoned.

1. Field of the Invention

This invention relates to apparatus for manipulating the controls of an automobile.

2. Prior Art

U.S. Pat. No. 2,281,159 to Kliesrath et al discloses a transmission operating mechanism including a vacuum operator motor 20 connected to a lever 26. A vacuum operated motor for the gear shifter is mounted on the dash board while a vacuum operated motor for the clutch is mounted on the fire wall.

U.S. Pat. No. 3,713,332 to Herrbrich teaches an automatic manual transmission shifting mechanism including working cylinders 15 and 16 attached to gear shift lever 20 and a cylinder 14 attached to a clutch pedal 19. This system uses a double pneumatic cylinder system on a base frame, the installation of which requires the removal of the driver seat.

U.S. Pat. No. 4,393,695 issued to Marshall et al discloses an automatic manual shift system for use in testing a vehicle. A throttle servo 31, a clutch servo 32 and gear shift servos 33 and 34 are connected to actuators for operating the throttle, clutch and gear shift, respectively. Servos 31–34 are located within the interior of the vehicle.

U.S. Pat. No. 3,465,577 issued to Donovan teaches an automatic manual transmission shifter including hydraulic cylinders 76 and 78 attached to column gear shift lever 26 and hydraulic cylinder 34 attached to clutch pedal 16. In this system, the hydraulic cylinders for column shifting are mounted on an external support which extends into the vehicle.

U.S. Pat. No. 4,466,279 issued to Gable et al teaches an automated driver system for a manual transmission vehicle including a gear shifting mechanism installed within the passenger compartment of a vehicle. The gear shifting mechanism includes a gear shift actuator with a DC motor, tachometer and lead screw assembly, a linear displacement transducer, a base mounting plate, a lazy-susan mounting mechanism for the gear shift actuator, a solenoid and a spring-loaded mounting bracket.

The uncovered prior art patents teach pneumatic, hydraulic or electric actuation systems which are installed within the vehicle. There still remains a need for improved installation of an automatic driving system. The installation apparatus itself should be relatively simple and capable of being installed in a relatively short time period. Easy and rapid installation is advantageous when it is necessary to move the mechanism for actuating the automotive controls from vehicle to vehicle for successive testing of the vehicles. These are some of the problems this invention overcomes.

SUMMARY OF THE INVENTION

An automatic driving system includes an accelerator pedal actuator system having a contact sensor for sensing contact between a mechanical actuation means and the accelerator pedal. The mechanical actuation means is mounted in the vehicle to contact the accelerator and includes a flexible cable extending out of the vehicle. The mechanical actuation means is a force transmitting member and not a force generating member. An electronic actuator is mounted outside the vehicle, coupled to the flexible cable, and includes a motor, a tachometer, a lead screw assembly and a linear displacement transducer. The motor of the electronic actuator is the force generating member of the accelerator pedal actuator system.

The unit on board the vehicle is advantageously small and can be usually installed in a number of vehicles. The control and driving power for the onboard portion comes from an offboard portion which is coupled to the onboard portion by the flexible cable. As a result, the portion that must be moved from vehicle to vehicle is lighter and smaller.

BRIEF DESCRIPTION OF THE DRAWINGS

FIGS. 2A and 2B are perspective views of the accelerator pedal actuator system, externally and internally mounted, respectively, for the driving system of FIG. 1;

FIG. 3 is a block diagram of the control system of the accelerator pedal actuator system for driving the system of FIG. 1 in accordance with an embodiment of this invention; and FIG. 4 is a side view of a contact sensor in accordance with an embodiment of this invention.

DETAILED DESCRIPTION OF THE INVENTION

Figure 1:
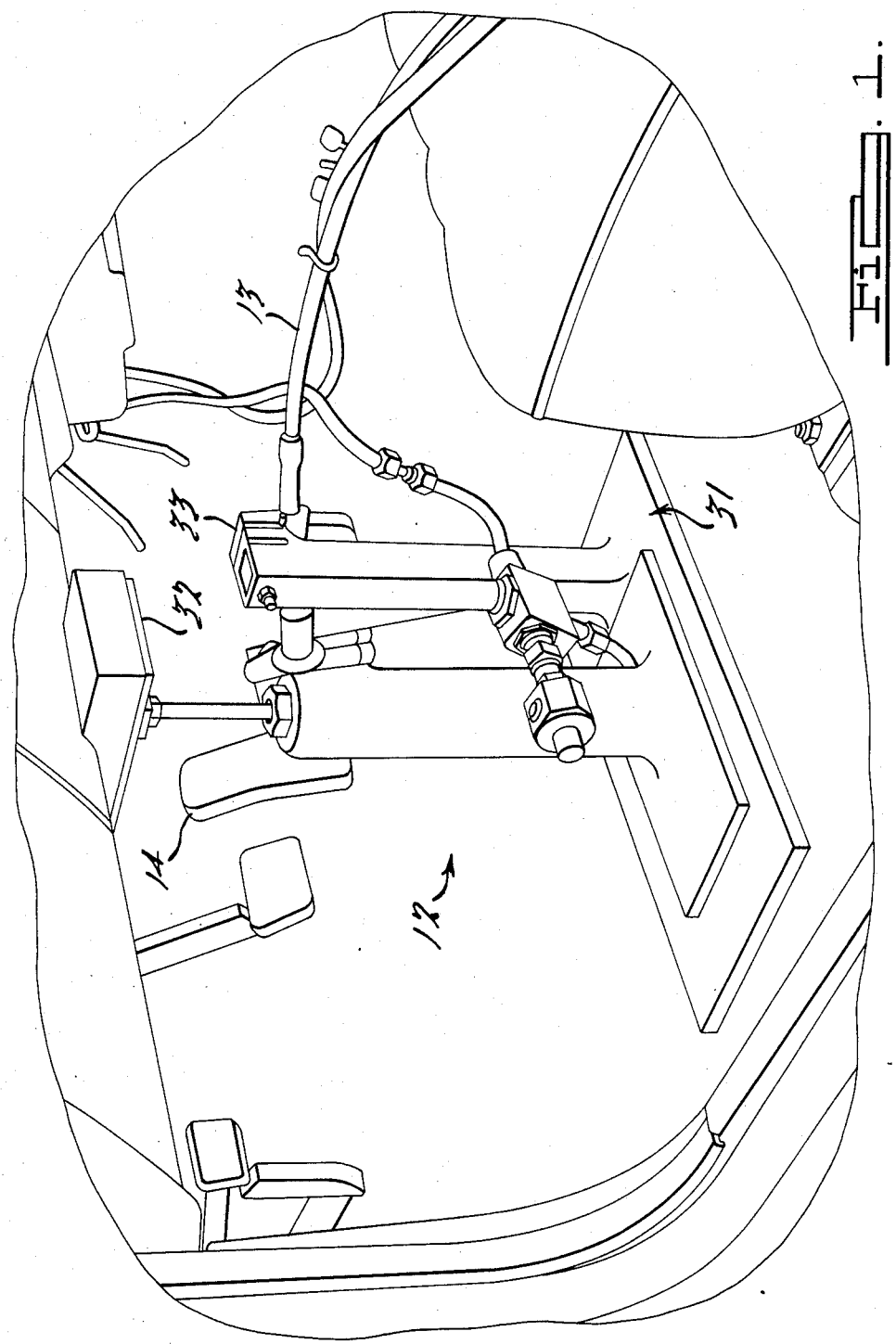
FIG. 1 is a perspective view of an accelerator pedal actuator system installed in a vehicle in accordance with an embodiment of this invention.

Referring to FIGS. 1, 2A and 2B, an automatic driver system includes an accelerator pedal actuator system 10 including an external electronic accelerator actuator 11 connected to a mechanical actuation means 12 through a flexible cable 13 to move accelerator pedal 14. Referring to FIG. 3, accelerator pedal actuator system 10 further includes a microprocessor 15, interface electronics 16, an analog electronic controller 17 and a servo amplifier 18.

Referring to FIG. 3, electronic accelerator actuator 11 includes a motor 21, a tachometer 22, a lead screw assembly 23 and a linear displacement transducer 24. Motor 21 receives its electrical power from servo amplifier 18. As tachometer 22 turns, it produces a voltage which is applied to servo amplifier 18 to control the velocity of motor 21. Motor 21 turns a belt that drives lead screw assembly 23 to convert rotation of the motor to linear movement.

The mechanical, flexible cable 13 from electronic actuator 11 to mechanical actuation means 12 transmits the linear movement of the electronic actuator to the mechanical actuation means. Referring to FIGS. 1 and 2B, mechanical actuation means 12 rests on a base plate 31 which also includes a clamping device 32 to hold mechanical actuation means 12 in the vehicle. An adjusting means 33 allows both the height and the angle of actuation to accelerator pedal 14 to be changed.

Referring to FIGS. 1 and 2B, mechanical actuation means 12 includes an extendable air pressure actuated cylinder 54 which is coupled to clamping device 32 and moves clamping device 32 so that it abuts a portion of the vehicle thereby stabilizing mechanical actuation means 12. An air pressure control valve 55 operated by a handle 50 is coupled to cylinder 54 through a cylinder pressure inlet 51 into cylinder 54 and to the atmosphere through a valve pressure bleed 53 to reduce the pressure within cylinder 54. Air pressure is supplied to control valve 55 through a pressure supply valve inlet 52. In operation, cylinder 54 can be extended by positioning handle 50 so that pressure from valve inlet 52 is routed to cylinder inlet 51 and into cylinder 54. Thus, clamping device 32 moves to abut a portion of the vehicle so as to restrain mechanical actuation means 12. To retract clamping device 32, handle 50 is positioned so that pressure from cylinder 54 can be exhausted through valve pressure bleed 53. A third position of the handle 50 closes both cylinder inlet 51 and valve pressure bleed 53 so as to maintain a constant air pressure within cylinder 54. Mechanical actuation means 12 is relatively light-weight and compact because there is no motor or other source of actuation power and cylinder 54 itself is relatively light-weight.

More particularly, microprocessor 15 receives an input from accelerator pedal touch switch 41 and linear displacement transducer 24. Linear displacement transducer 24 senses the longitudinal position of lead screw assembly 23. Accelerator pedal touch switch 41 senses contact between accelerator pedal 14 and mechanical actuation means 12. Microprocessor 15 applies an analog signal through analog controller 17, to interface electronics 16. Interface electronics 16 also receives an analog input from microprocessor 15 and from linear displacement transducer 24. Servo amplifier 18 receives an input from interface electronics 16 and tachometer 22. Tachometer 22 is coupled to motor 21 in order to detect motor speed. The output of servo amplifier 18 is applied to motor 21 which in turn applies a rotation of movement to lead screw assembly 23 coupled to motor 21 by a belt. Flexible cable 13 couples the output of lead screw assembly 23 to mechanical actuation means 12. Mechanical actuation means 12 then applies movement to accelerator pedal 14 through accelerator pedal touch switch 41.

Linear displacement transducer 24 converts the linear position of lead screw assembly 23 into a voltage that is applied to interface electronics 16 and fed back to the microprocessor 15.

To operate accelerator pedal actuator system 10, microprocessor 15 sends an analog signal to interface electronics 16 through a line 42 to move lead screw assembly 23 of electronic actuator 11 out slowly. As this movement takes place, the output of linear displacement transducer 24 changes with the movement. This movement continues until the accelerator pedal touch switch 41 presses against accelerator pedal 14 and closes. When switch 41 closes, microprocessor 15 receives an input of zero volts from switch 41. The system stops all movement of actuator 11 and reads the linear displacement transducer 24 to establish the zero point of accelerator pedal actuator system 10.

In effect, such action adjusts system 10 to take the slack out of flexible cable 13, and compensate for any variation in installation of mechanical actuation means 12. Microprocessor 15 subsequently uses this stored zero actuator point as the vehicle idle speed position for system operation. This process of establishing a reference point is done each time before the system is used to operate the accelerator pedal. For system operation, microprocessor 15 provides a command signal for the vehicle idle speed position through analog controller 17. This command signal from analog controller 17 is compared with the voltage from the linear displacement transducer 24 by the interface electronics. A resulting signal of positive value would drive lead screw assembly 23 of electronic actuator 11 in the outward direction. A negative voltage would retract lead screw assembly 23.

Referring to FIG. 4, accelerator pedal touch switch 41 includes a movable electrical contact 45, a fixed electrical contact 43 and an electrically isolated spring 44 separating the two contacts. Fixed electrical contact 43 is generally an annular conductive member with a central opening for passing spring 44 so it is electrically isolated from fixed electrical contact 43. Movable electrical contact 45 is coupled to spring 44 and compresses spring 44 in response to pressure from accelerator pedal 14 so as to electrically contact fixed electrical contact 43 and indicate contact with accelerator pedal 14. In operation, as mechanical actuation means 12 moves toward accelerator pedal 14, the pressure from accelerator pedal 14 will compress spring 44 of touch switch 41 causing movable contact 45 to touch fixed electrical contact 43. The voltage on fixed electrical contact 43 is then coupled to ground potential giving an indication that mechanical actuation means 12 has touched accelerator pedal 14.

In operation, such a system compensates for the variability that occurs when an accelerator pedal actuator is installed in a vehicle at varying positions. With such installation, the system can establish a new reference position. Microprocessor 15 stores the reference position and uses it to establish a vehicle idle speed position for the vehicle accelerator pedal.

Various modifications and variations will no doubt occur to those skilled in the arts to which this invention pertains. For example, the particular configuration of the clamping of the accelerator actuator within the vehicle can be varied from that disclosed herein. Motor 21 can be actuated by hydraulic or pneumatic means instead of electrical means. These and all other variations which basically rely on the teachings through which this disclosure has advanced the art are properly considered within the scope of this invention.

We claim:

1. An automatic driver system for a vehicle with an engine associated with an accelerator pedal, and including an accelerator pedal actuator system having:

a force generating electronic actuation means mounted outside the vehicle, said electronic actuation means including a motor coupled to a tachometer for measuring rotational speed, a servo amplifier coupled to said motor and said tachometer for receiving an input signal from said tachometer and applying an output driving signal to said motor thereby controlling the speed of said motor, a lead screw assembly, driven by rotational movement of said motor, for transforming rotational movement to linear movement, and a linear displacement transducer, coupled to said lead screw assembly, for measuring linear position of said lead screw assembly.

a force transmitting mechanical actuation means mounted in the vehicle for transmitting a force to contact and move the accelerator pedal, said mechanical actuation means including a mounting means whereby the height and angle of an actuating force transmitted to the accelerator pedal can be adjusted;

a flexible cable coupling the electronic and mechanical actuation means for transmitting the forces from the electronic actuation means to the mechanical actuation means translating said forces to linear movement of the accelerator pedal, and said flexible cable being coupled to said mounting means of the mechanical actuation means and extending outside the vehicle to the lead screw assembly of electronic actuation means; and a contact sensor means for sensing contact between said mechanical actuation means and the accelerator pedal.

2. An automatic driving system as recited in claim 1 wherein said mechanical actuation means includes:

an air pressure cylinder means coupled to said mounting means for locking said mechanical actuation means in place in the vehicle by extending said air pressure cylinder means so as to abut a portion of the vehicle; and a control valve means coupled between a source of air pressure and said air pressure cylinder means for selectively increasing, decreasing or maintaining air pressure in said air pressure cylinder means so as to provide for extending, retracting or maintaining a fixed position of said air pressure cylinder means.

3. An automatic driving system as recited in claim 2 wherein said contact sensor means includes:

a fixed electrical contact; and a movable electrical contact biased away from said fixed electrical contact and moveable toward said fixed electrical contact upon contact with the accelerator pedal.

4. An automatic driving system as recited in claim 3 wherein:

said fixed electrical contact is generally an annular conductive member with a central opening for passing a spring electrically isolated from said annular conductive member; and said moveable electrical contact being a conductive member coupled to said spring and compressing said spring in response to pressure from the accelerator pedal so as to electrically contact said fixed electrical contact indicating contact between the accelerator pedal and the mechanical actuation means.

5. An automatic driving system as recited in claim 1 wherein said electronic actuation means includes adjusting means for taking the slack out of said flexible cable and for compensation for variation in installing said mechanical actuation means, so that there is a reference point established indicating the beginning of contact between said contact sensor and the accelerator pedal.

6. An automatic driving system as recited in claim 5 wherein said adjusting means includes:

a microprocessor coupled to said contact sensor and linear displacement transducer for generating a control signal to command motion of said motor of said electronic actuation means in response to feedback signals from said contact sensor and said linear displacement transducer, said microprocessor command is stopped, when said contact sensor means indicates the mechanical actuation means is in contact with the accelerator pedal, causing the mechanical actuation means to stop in a stopped position;

said microprocessor recording said stopped position of said mechanical actuation means by said linear displacement transducer of said electronic actuation means; and said microprocessor setting said stopped position as the vehicle idle speed position for the accelerator pedal.

7. An automatic driving system as recited in claim 6 wherein said motor is coupled to said lead screw assembly using a belt for transforming a rotary movement of said motor to a linear movement of said lead screw assembly.

* * * * *